US012198632B2

(12) United States Patent
Jang et al.

(10) Patent No.: US 12,198,632 B2
(45) Date of Patent: Jan. 14, 2025

(54) DISPLAY DEVICE AND METHOD OF DRIVING THE SAME

(71) Applicant: Samsung Display Co., Ltd., Yongin-si (KR)

(72) Inventors: Jin Won Jang, Yongin-si (KR); Seung Won Kuk, Yongin-si (KR); Myung Chul Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/509,177

(22) Filed: Nov. 14, 2023

(65) Prior Publication Data

US 2024/0257746 A1 Aug. 1, 2024

(30) Foreign Application Priority Data

Jan. 26, 2023 (KR) ........................ 10-2023-0010455

(51) Int. Cl.
*G09G 3/3233* (2016.01)

(52) U.S. Cl.
CPC ... *G09G 3/3233* (2013.01); *G09G 2300/0426* (2013.01); *G09G 2300/0819* (2013.01); *G09G 2300/0842* (2013.01); *G09G 2320/045* (2013.01)

(58) Field of Classification Search
CPC ......... G09G 3/3233; G09G 2300/0426; G09G 2300/0819; G09G 2300/0842; G09G 2320/045
See application file for complete search history.

(56) References Cited

U.S. PATENT DOCUMENTS

| | | | | |
|---|---|---|---|---|
| 8,917,230 | B2 | 12/2014 | Shin et al. | |
| 11,302,248 | B2 | 4/2022 | Halbritter | |
| 11,393,964 | B2 | 7/2022 | Kim et al. | |
| 2015/0243217 | A1* | 8/2015 | Park | G09G 3/3258 345/76 |
| 2018/0068611 | A1* | 3/2018 | Chaji | G09G 3/325 |
| 2019/0081261 | A1* | 3/2019 | Lee | C09K 11/08 |

FOREIGN PATENT DOCUMENTS

| | | | |
|---|---|---|---|
| KR | 10-1050211 | B1 | 7/2011 |
| KR | 10-1696749 | B1 | 1/2017 |
| KR | 10-2021-0044938 | A | 4/2021 |

* cited by examiner

*Primary Examiner* — Premal R Patel

(74) *Attorney, Agent, or Firm* — Lewis Roca Rothgerber Christie LLP

(57) ABSTRACT

A display device includes a pixel circuit configured to generate a driving current based on a data signal supplied to a data line, a first light-emitting stage configured to emit light based on the driving current, and including first light-emitting elements connected in parallel, a detector configured to detect voltages of respective ends of the first light-emitting stage, and a current compensator configured to compensate for a current flowing through the first light-emitting stage based on a first voltage difference between the voltages of the respective ends of the first light-emitting stage.

19 Claims, 11 Drawing Sheets

DISPLAY DEVICE AND METHOD OF DRIVING THE SAME

CROSS-REFERENCE TO RELATED APPLICATION

This application claims priority to, and the benefit of, Korean Patent Application No. 10-2023-0010455, filed on, Jan. 26, 2023, in the Korean Intellectual Property Office, the content of which in its entirety is herein incorporated by reference.

BACKGROUND

1. Field

The disclosure relates to a display device and a method of driving the same.

2. Description of the Related Art

Recently, as interest in information display is increased, research and development of a display device are continuously being conducted.

SUMMARY

An aspect of the disclosure is to provide a display device and a method of driving the same, the display device including a current compensator for compensating for current concentration on light-emitting elements included in a pixel and connected in parallel.

However, the disclosure is not limited to the above-described aspects, and may be variously expanded without departing from the spirit and scope of the disclosure.

In order to achieve an aspect of the disclosure, according to one or more embodiments of the disclosure, a display device may include a pixel circuit configured to generate a driving current based on a data signal supplied to a data line, a first light-emitting stage configured to emit light based on the driving current, and including first light-emitting elements connected in parallel, a detector configured to detect voltages of respective ends of the first light-emitting stage, and a current compensator configured to compensate for a current flowing through the first light-emitting stage based on a first voltage difference between the voltages of the respective ends of the first light-emitting stage.

The current compensator may include a first current mirror unit connected to the first light-emitting stage, and configured to provide a first compensation current to a path, which is connected with the first light-emitting stage in parallel, based on the first voltage difference.

The current compensator may further include a reference current generator for determining a compensation voltage based on the first voltage difference, and for generating a reference current corresponding to the first compensation current in response to the compensation voltage.

The reference current generator may include a first transistor connected between DC power and the first current mirror unit, and including a gate electrode configured to receive the compensation voltage.

The first current mirror unit may include a second transistor that is diode-connected, and that is configured to receive the reference current from the first transistor, and a third transistor including a gate electrode connected to a gate electrode of the second transistor, and configured to generate the first compensation current to which the reference current is copied.

The third transistor may be connected in parallel with the first light-emitting stage.

The reference current generator may be configured to turn off the first transistor when the first voltage difference is lower than a threshold value.

The reference current generator may be configured to select the compensation voltage using a lookup table having voltage values respectively corresponding to magnitudes of the first voltage difference.

The current compensator may be configured to limit a maximum current flowing to each of the first light-emitting elements using the first compensation current.

A sum of a total current of the first light-emitting elements and the first compensation current may be equal to the driving current.

The display device may further include a second light-emitting stage configured to emit light based on the driving current, connected with the first light-emitting stage in series, and including second light-emitting elements connected in parallel, wherein the detector is further configured to detect respective voltages of ends of the second light-emitting stage.

The current compensator may further include a second current mirror unit connected to the second light-emitting stage, and may be configured to provide a second compensation current to a path connected with the second light-emitting stage in parallel based on a second voltage difference between the respective voltages of the ends of the second light-emitting stage.

The current compensator may further include a reference current generator configured to determine a compensation voltage based on the second voltage difference, and configured to generate a reference current corresponding to the second compensation current in response to the compensation voltage.

In order to achieve an aspect of the disclosure, according to one or more embodiments of the disclosure, a method of driving a display device may include a light-emitting stage of light-emitting elements connected in parallel, the method including detecting respective voltages of ends of the light-emitting stage to which a driving current is applied, calculating a voltage difference between the voltages, and providing a compensation current to a current path connected to the light-emitting stage in parallel based on the voltage difference.

Providing the compensation current may include comparing the voltage difference with a threshold value, generating the compensation current based on a compensation voltage determined based on the voltage difference being equal to or greater than the threshold value, and suspending generation of the compensation current based on the voltage difference being lower than the threshold value.

The compensation voltage may drive a current mirror circuit for generating the compensation current, wherein a magnitude of the compensation current is adjusted according to the compensation voltage.

The compensation voltage may be selected from a lookup table having corresponding voltage values according to a magnitude of the voltage difference.

The compensation current may limit a maximum current flowing to each of the light-emitting elements when emitting light.

A sum of a total current of the light-emitting elements and the compensation current may be equal to the driving current.

The display device and the method of driving the same according to one or more embodiments of the disclosure may generate the compensation current flowing to the current path connected with light-emitting elements in parallel based on the voltage difference between the respective ends of the light-emitting stage. Therefore, the maximum current of each light-emitting element may be limited. In addition, a hot-spot and a deterioration deviation of the light-emitting elements caused by concentration of a current to the light-emitting element due to a contact defect, a conduction defect, or the like of some light-emitting elements occurring during an operation of the display device may be reduced, prevented, or minimized.

However, the disclosure is not limited to the above-described effect, and may be variously expanded without departing from the spirit and scope of the disclosure.

BRIEF DESCRIPTION OF THE DRAWINGS

The above and other aspects of the disclosure will become more apparent by describing in further detail embodiments thereof with reference to the accompanying drawings, in which.

DETAILED DESCRIPTION

Figure 1:
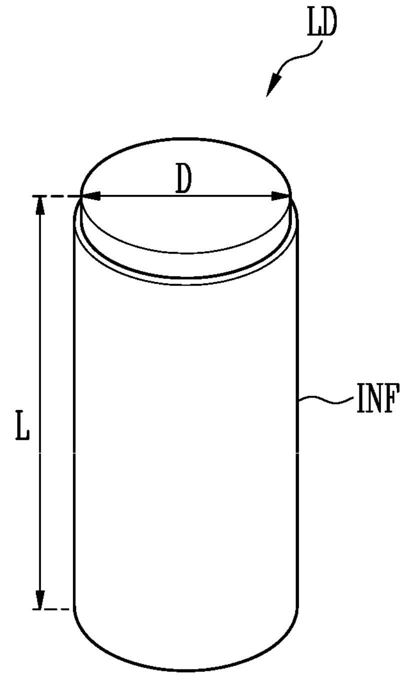
FIG. 1 is a perspective view schematically illustrating a light-emitting element according to one or more embodiments of the disclosure.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may have various modifications and may be embodied in different forms, and should not be construed as being limited to only the illustrated embodiments herein. Further, each of the features of the various embodiments of the present disclosure may be combined or combined with each other, in part or in whole, and technically various interlocking and driving are possible. Each embodiment may be implemented independently of each other or may be implemented together in an association. The described embodiments are provided as examples so that this disclosure will be thorough and complete, and will fully convey the aspects of the present disclosure to those skilled in the art, and it should be understood that the present disclosure covers all the modifications, equivalents, and replacements within the idea and technical scope of the present disclosure. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts that are not related to, or that are irrelevant to, the description of the embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Thus, the regions illustrated in the drawings are schematic in nature and their shapes are not intended to illustrate the actual shape of a region of a device and are not intended to be limiting. Additionally, as those skilled in the art would realize, the described embodiments may be modified in various ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form to avoid unnecessarily obscuring various embodiments.

Spatially relative terms, such as “beneath,” “below,” “lower,” “lower side,” “under,” “above,” “upper,” “upper side,” and the like, may be used herein for ease of explanation to describe one element or feature’s relationship to another element(s) or feature(s) as illustrated in the figures.

It will be understood that the spatially relative terms are intended to encompass different orientations of the device in use or in operation, in addition to the orientation depicted in the figures. For example, if the device in the figures is turned over, elements described as "below," "beneath," "or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled," or "directly on," refers to one component directly connecting or coupling another component, or being on another component, without an intermediate component. In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expression such as "at least one of A and B" and "at least one of A or B" may include A, B, or A and B. As used herein, "or" generally means "and/or," and the term "and/or" includes any and all combinations of one or more of the associated listed items. For example, the expression such as "A and/or B" may include A, B, or A and B. Similarly, expressions such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the term “substantially,” “about,” “approximately,” and similar terms are used as terms of approximation and not as terms of degree, and are intended to account for the inherent deviations in measured or calculated values that would be recognized by those of ordinary skill in the art. “About” or “approximately,” as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, “about” may mean within one or more standard deviations, or within ±30%, 20%, 10%, 5% of the stated value. Further, the use of “may” when describing embodiments of the present disclosure refers to “one or more embodiments of the present disclosure.”

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
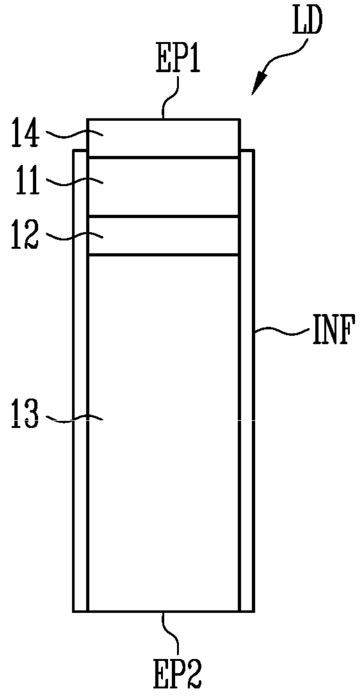
FIG. 2 is a cross-sectional view illustrating an example of the light-emitting element of FIG. 1.

FIG. 1 is a perspective view schematically illustrating a light-emitting element according to one or more embodiments of the disclosure, and FIG. 2 is a cross-sectional view illustrating an example of the light-emitting element of FIG. 1.

Referring to FIGS. 1 and 2, the light-emitting element LD may include a first semiconductor layer 11, an active layer 12, and a second semiconductor layer 13. In one or more embodiments, the light-emitting element LD may further include an electrode layer 14.

The light-emitting element LD may have various shapes. For example, the light-emitting element LD may have a column shape extending along one direction. The light-emitting element LD may have a first end EP1 and a second end EP2. One of the first and second semiconductor layers 11 and 13 may be adjacent to the first end EP1 of the light-emitting element LD. The other of the first and second semiconductor layers 11 and 13 may be adjacent to the second end EP2 of the light-emitting element LD. For example, the first semiconductor layer 11 may be adjacent to the first end EP1 of the light-emitting element LD, and the second semiconductor layer 13 may be adjacent to the second end EP2 of the light-emitting element LD.

According to one or more embodiments, the light-emitting element LD may be a light-emitting element manufactured in a column shape through an etching method or the like. In the present specification, the column shape includes a rod-like shape or a bar-like shape of which an aspect ratio is greater than 1, such as a circular column or a polygonal column, and the shape of the cross-section thereof is not limited.

The light-emitting element LD may have a size as small as a nanometer scale to a micrometer scale. For example, each light-emitting element LD may have a diameter D (or width) and/or a length L of a nanometer scale to micrometer scale range. However, a size of the light-emitting element LD is not necessarily limited thereto, and the size of the light-emitting element LD may be variously changed according to a design condition of various devices using a light-emitting device using the light-emitting element LD as a light source, for example, a display device or the like.

The first semiconductor layer 11 may be a semiconductor layer of a first conductivity type. For example, the first semiconductor layer 11 may include a p-type semiconductor layer. For example, the first semiconductor layer 11 may include at least one semiconductor material among In—AlGaN, GaN, AlGaN, InGaN, or AlN, and may include a p-type semiconductor layer doped with a first conductivity type dopant such as Mg. However, a material configuring the first semiconductor layer 11 is not necessarily limited thereto, and various other materials may be included in the first semiconductor layer 11.

The active layer 12 may be located between the first semiconductor layer 11 and the second semiconductor layer 13. The active layer 12 may include any one of a single well structure, a multi well structure, a single quantum well structure, a multi quantum well (MOW) structure, a quantum dot structure, or a quantum wire structure, but is not necessarily limited thereto. The active layer 12 may include GaN, InGaN, InAlGaN, AlGaN, or AlN, and various other materials may be included in the active layer 12.

When a voltage that is equal to or greater than a threshold voltage is applied across the ends of the light-emitting element LD, an electron-hole pair is combined in the active layer 12, and thus the light-emitting element LD may emit light.

The second semiconductor layer 13 may be located on the active layer 12, and may include a semiconductor layer of a type different from that of the first semiconductor layer 11. The second semiconductor layer 13 may include an n-type semiconductor layer. For example, the second semiconductor layer 13 may include any one semiconductor material among InAlGaN, GaN, AlGaN, InGaN, and AlN, and may include an n-type semiconductor layer doped with a second conductivity type dopant such as Si, Ge, and Sn. However, a material configuring the second semiconductor layer 13 is not necessarily limited thereto, and various other materials may be included in the second semiconductor layer 13.

The electrode layer 14 may be located on the first end EP1 and/or the second end EP2 of the light-emitting element LD. FIG. 2 illustrates a case in which the electrode layer 14 is formed on the first semiconductor layer 11, but the disclosure is not necessarily limited thereto. For example, a separate contact electrode may be further located on the second semiconductor layer 13.

The electrode layer 14 may include a transparent metal or a transparent metal oxide. For example, the electrode layer 14 may include at least one of indium tin oxide (ITO), indium zinc oxide (IZO), and zinc tin oxide (ZTO), but is not necessarily limited thereto. As described above, when the electrode layer 14 is formed of the transparent metal or the transparent metal oxide, light generated in the active layer 12 of the light-emitting element LD may pass through the electrode layer 14 and may be emitted to an outside of the light-emitting element LD.

An insulating film INF may be provided on a surface of the light-emitting element LD. The insulating film INF may be directly located on a surface of the first semiconductor layer 11, the active layer 12, the second semiconductor layer 13, and/or the electrode layer 14. The insulating film INF may expose the first and second ends EP1 and EP2. According to one or more embodiments, the insulating film INF may expose a side portion of the electrode layer 14 and/or the second semiconductor layer 13 adjacent to the first and second ends EP1 and EP2 of the light-emitting element LD.

The insulating film INF may reduce or prevent the likelihood of an electrical short that may occur when the active layer 12 comes into contact with a conductive material except for the first and second semiconductor layers 11 and 13. The insulating film INF may reduce or minimize a surface defect of the light-emitting element LD, thereby improving a lifespan and emission efficiency of the light-emitting element LD.

The insulating film INF may include one or more selected from a group of silicon oxide (SiOx), silicon nitride (SiNx), silicon oxynitride (SiOxNy), aluminum nitride (AlNx), aluminum oxide (AlOx), zirconium oxide (ZrOx), hafnium oxide (HfOx), and/or titanium oxide (TiOx). For example, the insulating film INF may be configured as double layers, and each layer configuring the double layers may include different materials. For example, the insulating film INF may be configured as double layers configured of aluminum oxide (AlOx) and silicon oxide (SiOx), but the disclosure is not necessarily limited thereto. According to one or more embodiments, the insulating film INF may be omitted.

A light-emitting device including the light-emitting element LD described above may be used in various types of devices that suitably use a light source, including a display device.

Figure 3:
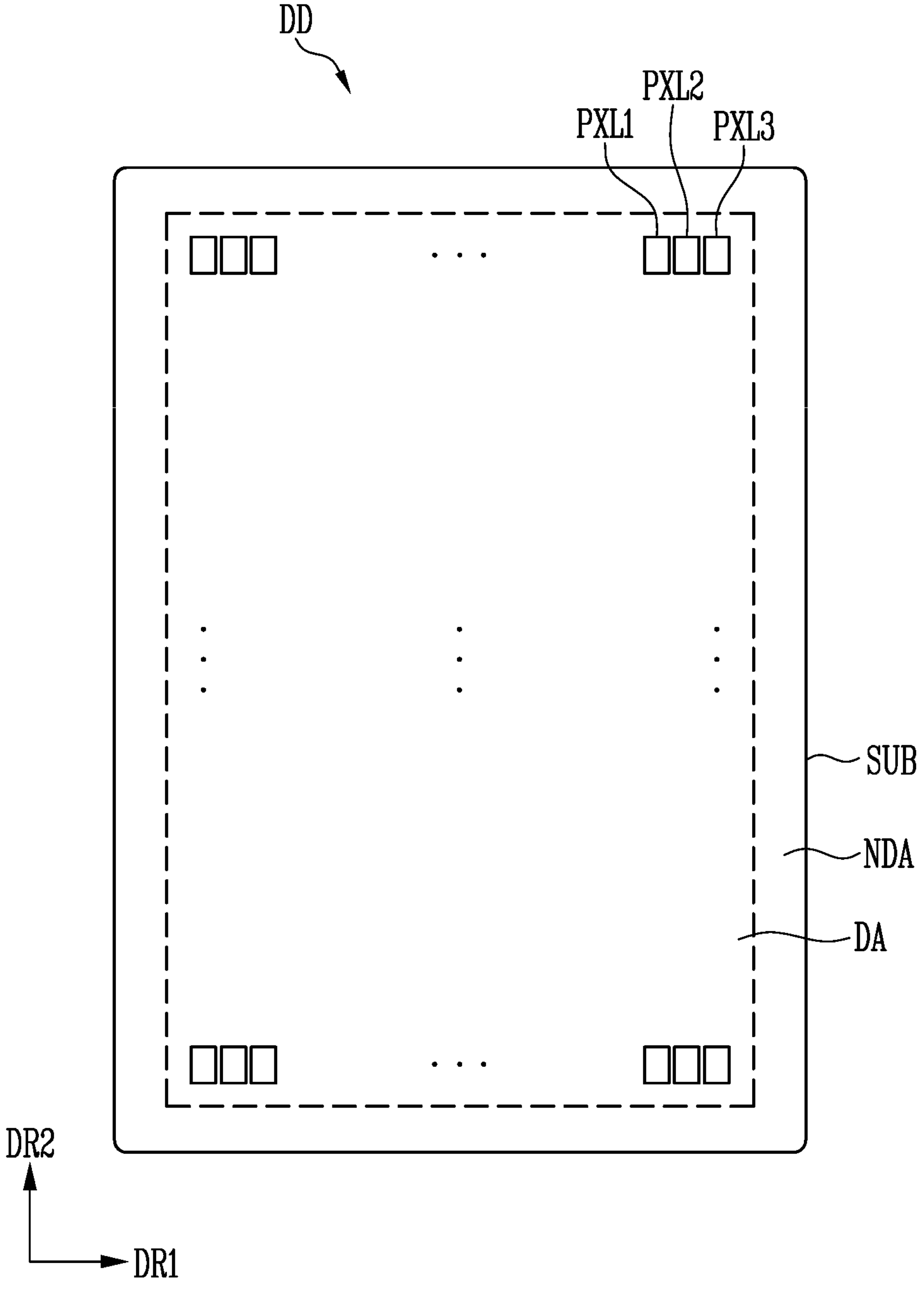
FIG. 3 is a plan view illustrating a display device according to one or more embodiments of the disclosure.

FIG. 3 is a plan view illustrating a display device according to one or more embodiments of the disclosure.

When the display device DD is an electronic device to which a display surface is applied to at least one surface, such as a smartphone, a television, a tablet PC, a mobile phone, a video phone, an e-book reader, a desktop PC, a laptop PC, a netbook computer, a workstation, a server, a medical device, a camera, or wearable device, the disclosure may be applied to the display device.

Referring to FIGS. 1, 2, and 3, the display device DD may include a substrate SUB, pixels PXL1, PXL2, and PXL3 provided on the substrate SUB and each including at least one light-emitting element LD, a driver provided on the substrate SUB and driving the pixels PXL1, PXL2, and PXL3, and a line unit connecting the pixels PXL1, PXL2, and PXL3 and the driver.

The substrate SUB may include a display area DA and a non-display area NDA.

The display area DA may be an area where the pixels PXL1, PXL2, and PXL3 for displaying an image are provided. The non-display area NDA may be an area where the driver for driving the pixels PXL1, PXL2, and PXL3, and a portion of the line unit connecting the pixels PXL1, PXL2, and PXL3 and the driver, are provided.

The non-display area NDA may be positioned adjacent to the display area DA. The non-display area NDA may be provided on at least one side of the display area DA. For example, the non-display area NDA may surround (e.g., in plan view) a circumference (or an edge) of the display area DA.

The line unit may electrically connect the pixels PXL1, PXL2, and PXL3. The line unit may include signal lines for providing a signal to the pixels PXL1, PXL2, and PXL3 and connected to each of the pixels PXL1, PXL2, and PXL3, for example, a scan line, a data line, and a fan-out line connected to each of the scan line and the data line.

The substrate SUB may include a transparent insulating material and may transmit light. The substrate SUB may be a rigid substrate or a flexible substrate.

Each of the pixels PXL1, PXL2, and PXL3 may be provided in the display area DA on the substrate SUB.

The pixels PXL1, PXL2, and PXL3 may include a first pixel PXL1, a second pixel PXL2, and a third pixel PXL3. In one or more embodiments, the first pixel PXL1 may be a red pixel, the second pixel PXL2 may be a green pixel, and the third pixel PXL3 may be a blue pixel. However, the disclosure is not limited thereto, and the pixels PXL1, PXL2, and PXL3 may emit light in colors other than red, green, and blue, respectively.

Each of the pixels PXL1, PXL2, and PXL3 may include a plurality of light-emitting elements LD driven by corresponding scan signal and data signal. The light-emitting element LD may have a size as small as a nano scale (or nanometer) to a micro scale (or micrometer), and may be connected in parallel with adjacently located light-emitting elements, but the disclosure is not limited thereto. The light-emitting element LD may configure a light source of each of the pixels PXL1, PXL2, and PXL3.

Figure 4:
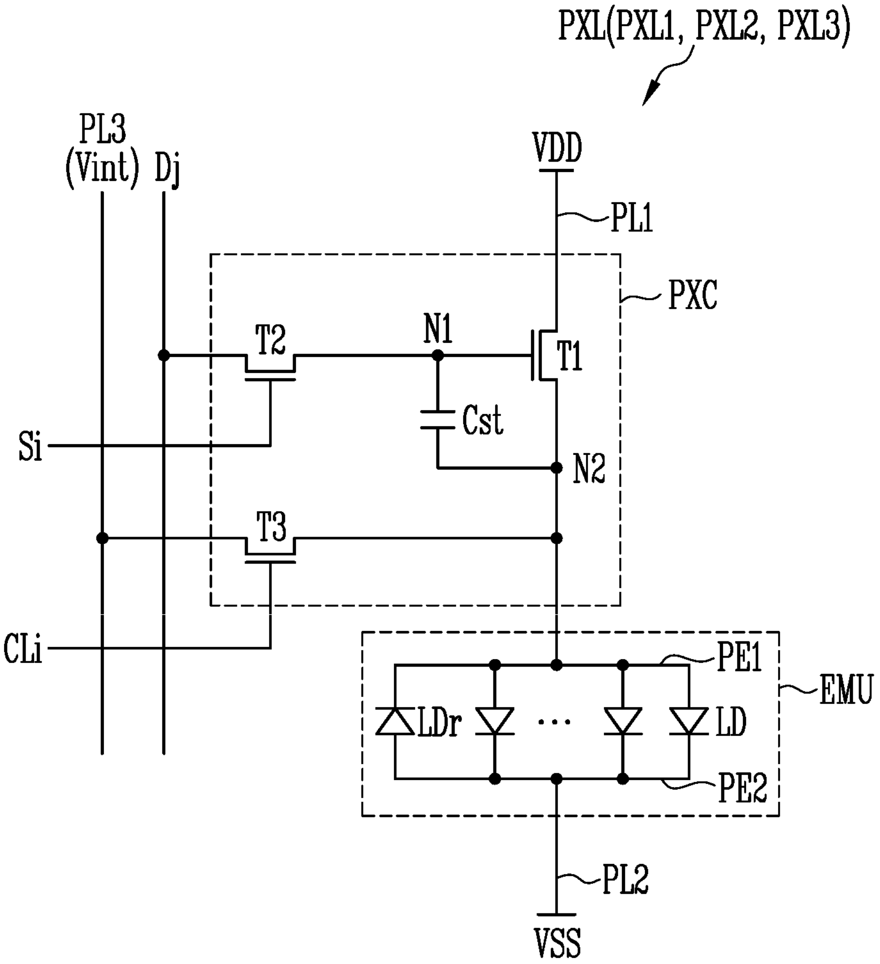
FIG. 4 is a circuit diagram illustrating an example of a pixel included in the display device of FIG. 3.

FIG. 4 is a circuit diagram illustrating an example of the pixel included in the display device of FIG. 3.

In one or more embodiments, when the first pixel PXL1, the second pixel PXL2, and the third pixel PXL3 are comprehensively named, the first pixel PXL1, the second pixel PXL2, and the third pixel PXL3 are referred to as a pixel PXL.

Referring to FIGS. 1, 2, 3, and 4, the pixel PXL may include a pixel circuit PXC and a light-emitting unit EMU.

In one or more embodiments, the light-emitting unit EMU may include light-emitting elements LD connected in parallel between a first power line PL1 and a second power line PL2. Each of the light-emitting elements LD may be connected to a first pixel electrode PE1 and to a second pixel electrode PE2. Each of the light-emitting elements LD connected in parallel in the same direction (e.g., a forward direction) between the first pixel electrode PE1 and the second pixel electrode PE2 may be an effective light source.

In one or more embodiments, the light-emitting unit EMU may further include at least one non-effective light source, for example, a reverse light-emitting element LDr. The reverse light-emitting element LDr may be connected between the first and second pixel electrodes PE1 and PE2 in a direction opposite to the light-emitting elements LD. A current does not substantially flow through the reverse light-emitting element LDr.

A voltage of first power VDD may be supplied to the first power line PL1, and a voltage of the second power VSS may be supplied to the second power line PL2. The first power VDD and the second power VSS may have different potentials. For example, the first power VDD may be set to high-potential power, and the second power VSS may be set to low-potential power. At this time, a potential difference between the first power VDD and the second power VSS may be set to be equal to or higher than a threshold voltage of the light-emitting elements during an emission period of the pixel PXL.

The pixel circuit PXC may be connected to a scan line Si (where i is a positive integer) and a data line Dj (where j is a positive integer) of the pixel PXL. In addition, the pixel circuit PXC may be further connected to a third power line PL3 and to a control line CLi. For example, when the pixel PXL is located in an i-th row and a j-th column of the display area DA, the pixel circuit PXC of the pixel PXL may be connected to the i-th scan line Si and the j-th data line Dj.

In one or more embodiments, the pixel circuit PXC may include first to third pixel transistors T1 to T3 and a storage capacitor Cst.

The first pixel transistor T1 may be a driving transistor for controlling a driving current applied to the light-emitting unit EMU. The first pixel transistor T1 may be connected between the first power line PL1 and the light-emitting unit EMU (e.g., the light-emitting elements LD). For example, a first electrode of the first pixel transistor T1 may be connected to the first power line PL1, and a second electrode of the first pixel transistor T1 may be connected to a second node N2. A gate electrode of the first pixel transistor T1 may be connected to a first node N1.

The first pixel transistor T1 may control an amount of the driving current applied from the first power VDD to the light-emitting unit EMU through the second node N2 according to a voltage applied to the first node N1.

The second pixel transistor T2 may be a switching transistor that selects and activates the pixel PXL in response to a scan signal. The second pixel transistor T2 may be connected between the j-th data line Dj and the first node N1. A gate electrode of the second pixel transistor T2 may be connected to the i-th scan line Si.

The second pixel transistor T2 may be turned on by the scan signal supplied to the i-th scan line Si, and may transmit a data signal to the gate electrode of the first pixel transistor T1.

The third pixel transistor T3 may be connected between the third power line PL3 and the second electrode of the first pixel transistor T1 (e.g., between the third power line PL3 and the second node N2). A gate electrode of the third pixel transistor T3 may be connected to the i-th control line CLi. In one or more embodiments, a control signal may be supplied to the i-th control line CLi at the same time point as the scan signal supplied to the i-th scan line Si.

The third power line PL3 may provide a voltage of third power Vint (e.g., initialization power). For example, the third power line PL3 may be commonly connected to the plurality of pixels PXL. The voltage of the third power Vint may be different from the voltage of the first power VDD and from the voltage of the second power VSS.

When the third pixel transistor T3 is turned on, the voltage of the third power Vint may be applied to the second node N2. When the data signal is supplied to the pixel PXL, the voltage of the third power Vint is supplied to the second node N2, and thus a voltage corresponding to a difference between the data signal and the third power Vint may be stored in the storage capacitor Cst. Therefore, stable driving of the pixel PXL is possible.

In one or more embodiments, one electrode of the third pixel transistor T3 may be connected to a sensing line that supplies a sensing signal, rather than to the third power line PL3. In this case, the display device DD may obtain a sensing value through the sensing line, and may detect a characteristic of the pixel PXL including a threshold voltage or the like of the first pixel transistor T1 using the sensing signal. Information on the characteristic of the pixel PXL may be used to convert image data.

The storage capacitor Cst may be connected between the first node N1 and the second node N2. The storage capacitor Cst may be charged with a data voltage corresponding to the data signal supplied to the first node N1. Accordingly, the storage capacitor Cst may store a voltage corresponding to a difference between the voltage of the gate electrode of the first pixel transistor T1 and the voltage of the second node N2.

In FIG. 4, one or more embodiments, in which all of the first, second, and third pixel transistors T1, T2, and T3 included in the pixel circuit PXC are N-type transistors, are disclosed, but the disclosure is not limited thereto. For example, at least one of the above-described first, second, and/or third pixel transistors T1, T2, and/or T3 may be changed to a P-type transistor. In addition, a structure of the pixel circuit PXC may be modified into various well-known structures.

Figure 5:
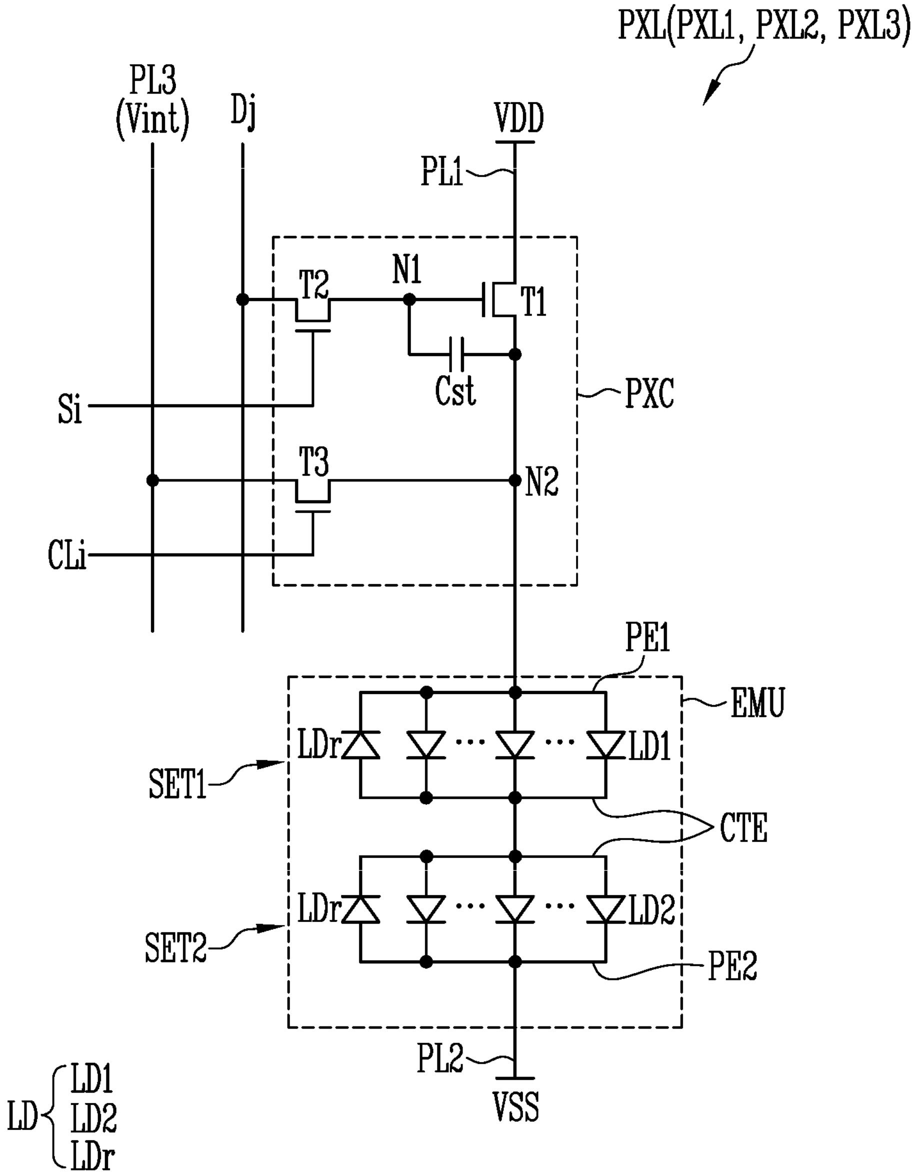
FIG. 5 is a circuit diagram illustrating an example of the pixel included in the display device of FIG. 3.

FIG. 5 is a circuit diagram illustrating an example of the pixel included in the display device of FIG. 3.

In FIG. 5, the same or similar components described with reference to FIG. 4 use the same reference numerals, and an overlapping description is omitted. A structure of the pixel PXL of FIG. 5 may be substantially identical to, or similar to, the structure of the pixel PXL of FIG. 4 except for a configuration of the light-emitting unit EMU.

Referring to FIGS. 1, 2, 3, and 5, the pixel PXL may include the pixel circuit PXC and the light-emitting unit EMU.

In one or more embodiments, the light-emitting unit EMU may include light-emitting stages SET1 and SET2 (series stages) respectively including a plurality of light-emitting elements LD connected in parallel with each other. For example, the light-emitting unit EMU may have a series/parallel mixed structure as shown in FIG. 5.

The light-emitting unit EMU may include first and second light-emitting stages SET1 and SET2 connected in series between the first power VDD and the second power VSS. Each of the first and second light-emitting stages SET1 and SET2 may include two electrodes PE1 and CTE, or two electrodes CTE and PE2, for configuring an electrode pair of a corresponding stage, and may include a plurality of light-emitting elements LD connected therebetween.

The first light-emitting stage SET1 (or a first series stage) may include a first pixel electrode PE1, an intermediate electrode CTE, and a plurality of first light-emitting elements LD1 connected between the first pixel electrode PE1 and the intermediate electrode CTE. In addition, the first light-emitting stage SET1 may include a reverse light-emitting element LDr connected in a direction opposite to the first light-emitting element LD1 between the first pixel electrode PE1 and the intermediate electrode CTE.

The second light-emitting stage SET2 (or a second series stage) may include the intermediate electrode CTE, the second pixel electrode PE2, and a second light-emitting elements LD2 connected between the intermediate electrode CTE and the second pixel electrode PE2.

The intermediate electrode CTE may be commonly included in the first light-emitting stage SET1 and the second light-emitting stage SET2. For example, the first light-emitting stage SET1 and the second light-emitting stage SET2 may share the intermediate electrode CTE. However, this is only an example, and the intermediate electrode CTE may be divided into a first intermediate electrode connected to the first light-emitting stage SET1 and a second intermediate electrode connected to the second light-emitting stage SET2. In this case, the first intermediate electrode and the second intermediate electrode may be electrically and/or physically connected.

In addition, the second light-emitting stage SET2 may include a reverse light-emitting element LDr connected in a direction opposite to the second light-emitting element LD2 between the intermediate electrode CTE and the second pixel electrode PE2.

In one or more embodiments, the first pixel electrode PE1 may be an anode of the pixel PXL, and the second pixel electrode PE2 may be a cathode of the pixel PXL. However, this is only an example, and the first pixel electrode PE1 may be a cathode, and the second pixel electrode PE2 may be an anode.

As described above, the light-emitting unit EMU of the pixel PXL including the light-emitting stages SET1 and SET2 connected in the series/parallel mixed structure may suitably adjust a driving current/voltage condition according to an applied product specification.

For example, the light-emitting unit EMU of the series/parallel mixed structure of FIG. 5 may reduce the driving current compared to a light-emitting unit of a structure in which the light-emitting elements LD are connected only in parallel. In addition, the light-emitting unit EMU of the series/parallel mixed structure of FIG. 5 may reduce a driving voltage applied to both ends of the light-emitting unit EMU compared to a light-emitting unit in which the same number of light-emitting elements LD are connected in series. Furthermore, the light-emitting unit EMU of the series/parallel mixed structure of FIG. 5 may include more light-emitting elements LD between the same number of electrodes PE1, CTE, and PE2 compared to a structure in which all light-emitting elements LD are connected in series. In this case, light emission efficiency of the light-emitting elements LD may be improved.

Figure 6:
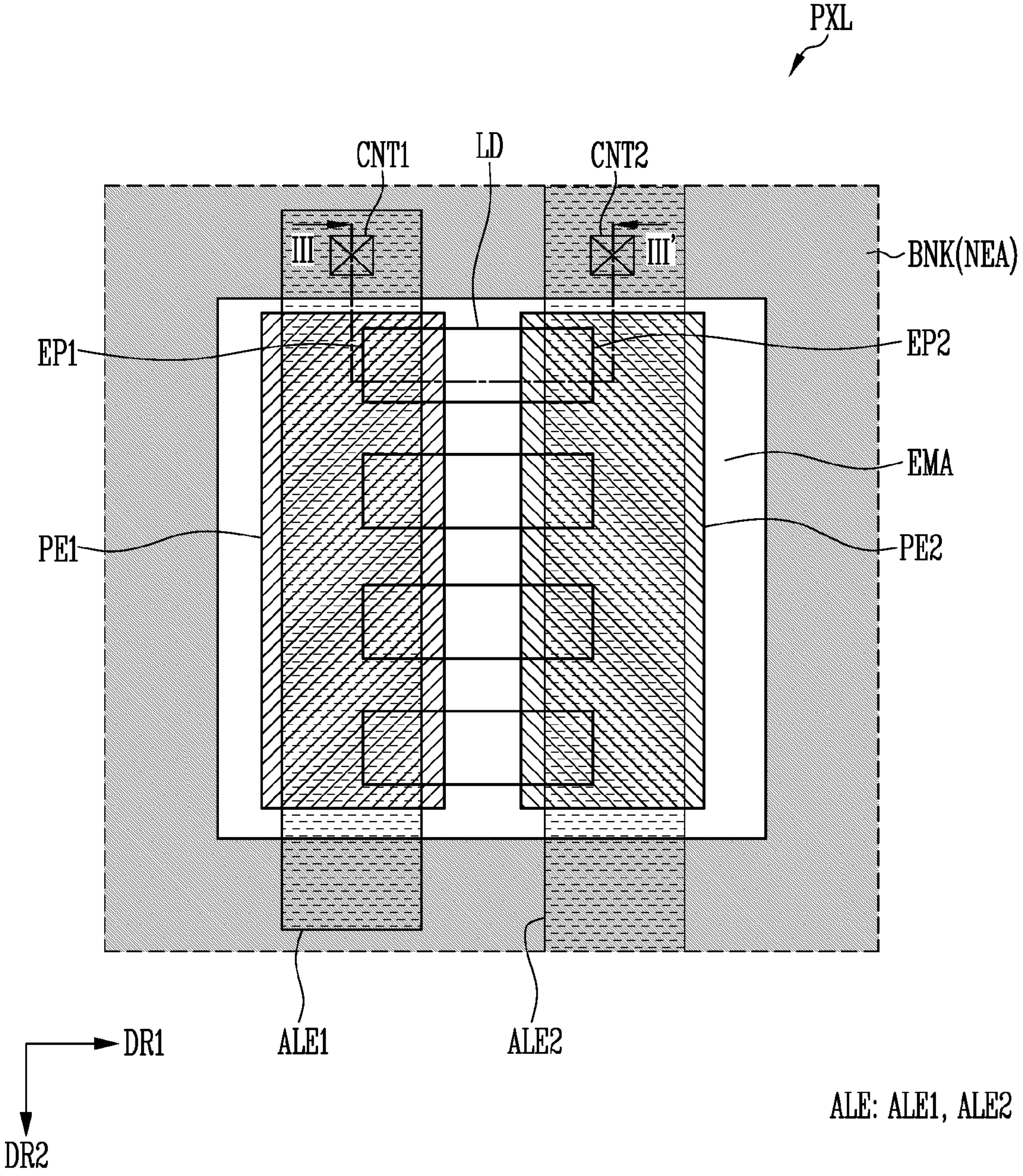
FIG. 6 is a schematic plan view illustrating an example of the pixel included in the display device of FIG. 3.

FIG. 6 is a schematic plan view illustrating an example of the pixel included in the display device of FIG. 3.

Referring to FIGS. 3, 4, and 5, the pixel PXL (or a pixel area) may include an emission area EMA and a non-emission area NEA. The pixel PXL may include a first alignment electrode ALE1, a second alignment electrode ALE2, the light-emitting elements LD, the first pixel electrode PE1, and the second pixel electrode PE2.

The light-emitting elements LD may be omitted from the non-emission area NEA. A portion of the non-emission area NEA may overlap a bank BNK when viewed in a plan view. For example, the bank BNK may define the emission area EMA and the non-emission area NEA. When viewed in a plan view, the bank BNK may overlap the non-emission area NEA. For example, the bank BNK may be a pixel-defining layer or a dam structure that defines the emission area EMA to which the light-emitting element LD is to be supplied in a process of supplying the light-emitting element LD to the pixel PXL.

Alignment electrodes ALE are electrodes for aligning the light-emitting elements LD. The alignment electrodes ALE may include the first alignment electrode ALE1 and the second alignment electrode ALE2.

The light-emitting elements LD may be located on the alignment electrode ALE. According to one or more embodiments, the light-emitting elements LD may be located (e.g., aligned) between the first alignment electrode ALE1 and the second alignment electrode ALE2.

According to one or more embodiments, the light-emitting elements LD may be aligned in various methods. For example, FIG. 4 shows one or more embodiments in which the light-emitting elements LD are aligned in parallel between the first alignment electrode ALE1 and the second alignment electrode ALE2. However, this is an example, and the light-emitting elements LD may be aligned in series or in series/parallel mixed structure, and the number of units connected in series and/or parallel is not particularly limited.

The first alignment electrode ALE1 and the second alignment electrode ALE2 may be spaced apart from each other. For example, the first alignment electrode ALE1 and the second alignment electrode ALE2 may be spaced apart from each other along the first direction DR1 in the emission area EMA, and each of the first alignment electrode ALE1 and the second alignment electrode ALE2 may extend along the second direction DR2.

The first alignment electrode ALE1 and the second alignment electrode ALE2 may be provided (or supplied) with a first alignment signal and a second alignment signal, respectively, in a process step in which the light-emitting elements LD are aligned. For example, an ink including the light-emitting elements LD may be supplied (or provided) to the emission area EMA defined by the bank BNK, the first alignment signal may be supplied to the first alignment electrode ALE1, and the second alignment signal may be supplied to the second alignment electrode ALE2. The light-emitting elements LD may be aligned according to an electric field formed by the first alignment signal and the second alignment signal.

In one or more embodiments, the first alignment electrode ALE1 may be electrically connected to the first pixel transistor T1 through a first contact hole CNT1.

In one or more embodiments, the second alignment electrode ALE2 may be electrically connected to a power line (e.g., the second power line PL2 of FIG. 4) through a second contact hole CNT2.

A position of the first contact hole CNT1 and the second contact hole CNT2 is not limited to the respective positions shown in FIG. 5, and may be variously changed appropriately.

The first end EP1 of the light-emitting element LD may be adjacent to the first alignment electrode ALE1, and the second end EP2 of the light-emitting element LD may be adjacent to the second alignment electrode ALE2.

According to one or more embodiments, the first end EP1 of each of the light-emitting elements LD may be electrically connected to the first alignment electrode ALE1 through the first pixel electrode PE1. In one or more other embodiments, the first end EP1 of each of the light-emitting elements LD may be directly connected to the first alignment electrode ALE1.

In still one or more other embodiments, the first end EP1 of each of the light-emitting elements LD may be electrically connected to only the first pixel electrode PE1, and may not be connected to the first alignment electrode ALE1. In this case, the first pixel electrode PE1 may be connected to the first pixel transistor T1 thereunder through a contact hole (e.g., predetermined contact hole) while avoiding the first alignment electrode ALE1.

Similarly, the second end EP2 of each of the light-emitting elements LD may be electrically connected to the second alignment electrode ALE2 and the second power line PL2 through the second pixel electrode PE2. In one or more other embodiments, the second end EP2 of each of the light-emitting elements LD may be directly connected to the second alignment electrode ALE2.

In still one or more other embodiments, the second end EP2 of each of the light-emitting elements LD may be electrically connected to only the second pixel electrode PE2, and may not be connected to the second alignment electrode ALE2.

The first pixel electrode PE1 may be located on the first ends EP1 to be electrically connected to the first ends EP1 of the light-emitting elements LD. In one or more embodiments, the first pixel electrode PE1 may be located on the first alignment electrode ALE1 to be electrically connected to the first alignment electrode ALE1.

The second pixel electrode PE2 may be located on the second ends EP2 to be electrically connected to the second ends EP2 of the light-emitting elements LD. In one or more embodiments, the second pixel electrode PE2 may be located on the second alignment electrode ALE2 to be electrically connected to the second electrode ALE2.

Figure 7:
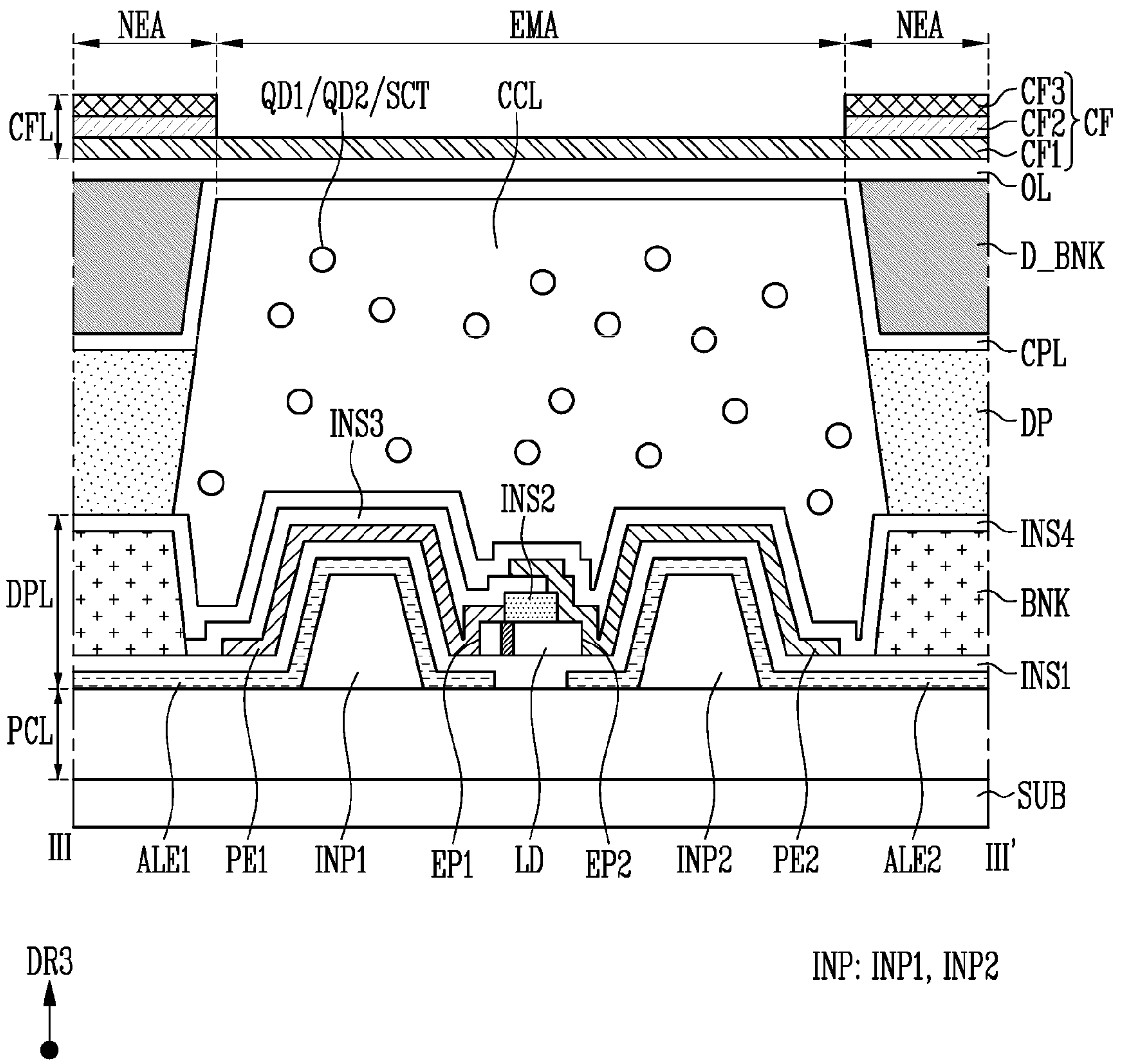
FIG. 7 is a schematic cross-sectional view illustrating an example taken along the line III-III' of FIG. 6.

FIG. 7 is a schematic cross-sectional view illustrating an example taken along the line III-III' of FIG. 6.

Referring to FIGS. 3, 4, 6, and 7, the pixel PXL may include the substrate SUB, a pixel circuit layer PCL, a display element layer DPL, and a color filter layer CFL. In one or more embodiments, the pixel PXL may further include an optical layer between the display element layer DPL and the color filter layer CFL.

The substrate SUB may form a base member of the display device DD. The substrate SUB may be a rigid or flexible substrate or film. The substrate SUB may include a transparent insulating material to allow light to pass therethrough.

The pixel circuit layer PCL may be located on the substrate SUB. The pixel circuit layer PCL may include the pixel circuit PXC described with reference to FIG. 4. In one or more embodiments, the pixel circuit layer PCL may further include at least partial configuration of current compensators 200 and 200A shown in FIGS. 9 and 10. For example, the pixel circuit layer PCL may further include a current mirror circuit (e.g., current mirror units 240 and 280) connected to the light-emitting unit EMU.

The display element layer DPL may be provided on the pixel circuit layer PCL. The display element layer DPL may include a first insulating pattern INP1, a second insulating pattern INP2, the first alignment electrode ALE1, the second alignment electrode ALE2, the bank BNK, the light-emitting element LD, the first pixel electrode PE1, the second pixel electrode PE2, a first insulating layer INS1, a second insulating layer INS2, a third insulating layer INS3, and a fourth insulating layer INS4.

The first insulating pattern INP1 and the second insulating pattern INP2 may be located on the via layer VIA. The first insulating pattern INP1 and the second insulating pattern INP2 may protrude in a thickness direction (e.g., a third direction DR3) of the substrate SUB. The first insulating pattern INP1 and the second insulating pattern INP2 may include an organic material and/or an inorganic material.

The light-emitting element LD may be located between the first insulating pattern INP1 and the second insulating pattern INP2. For example, the first and second insulating patterns INP1 and INP2 may define spaces in which the light-emitting element LD is accommodated and arranged.

In one or more embodiments, the first alignment electrode ALE1 and the second alignment electrode ALE2 may be located on the pixel circuit layer PCL. A portion of the first alignment electrode ALE1 may be located on the first insulating pattern INP1, and a portion of the second alignment electrode ALE2 may be located on the second insulating pattern INP2. Each of the portion of the first alignment electrode ALE1 and the portion of the second alignment electrode ALE2 may function as a reflective partition wall.

In one or more embodiments, the first alignment electrode ALE1 may be electrically connected to the first end EP1 of the light-emitting element LD through the first pixel electrode PE1, and the second alignment electrode ALE2 may be electrically connected to the second end EP2 of the light-emitting element LD2 through the second pixel electrode PE2. However, this is an example, and at least one of the first alignment electrode ALE1 and/or the second alignment electrode ALE2 may be electrically insulated from the light-emitting element LD.

The first and second alignment electrodes ALE1 and ALE2 may include a conductive material. For example, the first and second alignment electrodes ALE1 and ALE2 may include one of silver (Ag), magnesium (Mg), aluminum (Al), platinum (Pt), palladium (Pd), gold (Au), nickel (Ni), neodymium (Nd), iridium (Ir), chromium (Cr), titanium (Ti), and/or an alloy thereof. However, the first and second alignment electrodes ALE1 and ALE2 are not limited to the above-described example.

The first insulating layer INS1 may be located on the via layer VIA. The first insulating layer INS1 may cover the first and second alignment electrodes ALE1 and ALE2. The first insulating layer INS1 may stabilize a connection between electrode configurations, and may reduce an external influence. The first insulating layer INS1 may include one of silicon oxide (SiOx), silicon nitride (SiNx), silicon oxynitride (SiOxNy), aluminum oxide (AlOx), and/or titanium oxide (TiOx).

The bank BNK may be located on the first insulating layer INS1. The bank BNK may protrude in the thickness direction of the substrate SUB. The bank BNK may have a shape surrounding the emission area EMA. According to one or more embodiments, the bank BNK may include an organic material and/or an inorganic material. The bank BNK may correspond to the non-emission area NEA.

The light-emitting element LD may be located on the first insulating layer INS1. The light-emitting element LD may overlap a portion of the first alignment electrode ALE1 and a portion of the second alignment electrode ALE2.

The second insulating layer INS2 may be located on the light-emitting element LD. The second insulating layer INS2 may cover the active layer 12 of FIG. 1 of the light-emitting element LD. In addition, the second insulating layer INS2 may reduce or prevent the likelihood of a short between adjacent electrodes (e.g., the first pixel electrode PE1 and the second pixel electrode PE2). The second insulating layer INS2 may include an organic material or an inorganic material.

The first pixel electrode PE1 may contact the first end EP1 of the light-emitting element LD, and may be located on the first insulating layer INS1. The first pixel electrode PE1 may be an anode electrode electrically connected to the first pixel transistor T1.

The third insulating layer INS3 may be located on the first pixel electrode PE1. The third insulating layer INS3 may reduce or prevent the likelihood of an electrical short between the first pixel electrode PE1 and the second pixel electrode PE2. The third insulating layer INS3 may include inorganic insulating material.

The second pixel electrode PE2 may contact the second end EP2 of the light-emitting element LD, and may be located on the first insulating layer INS1, the second insulating layer INS2, and the third insulating layer INS3. The second pixel electrode PE2 may be a cathode electrode electrically connected to the second power line PL2.

As shown in FIG. 7, the first pixel electrode PE1 and the second pixel electrode PE2 may be located on different respective layers as a result of different respective processes. However, this is an example, and the first pixel electrode PE1 and the second pixel electrode PE2 may be formed of the same material by the same process.

The first pixel electrode PE1 and the second pixel electrode PE2 may include a conductive material. For example, the first pixel electrode PE1 and the second pixel electrode PE2 may include a transparent conductive material including one of indium tin oxide (ITO), indium zinc oxide (IZO), and/or indium tin zinc oxide (ITZO). However, the disclosure is not necessarily limited to the above-described example.

The fourth insulating layer INS4 may be located on the third insulating layer INS3, and may cover the first pixel electrode PE1 and the second pixel electrode PE2. The fourth insulating layer INS4 may protect lower configurations of the display element layer DPL. In one or more embodiments, the fourth insulating layer INS4 may be integrally formed in the entire emission area EMA and non-emission area NEA. In this case, the fourth insulating layer INS4 may extend on the bank BNK.

The fourth insulating layer INS4 may include one material among silicon oxide (SiOx), silicon nitride (SiNx), silicon oxynitride (SiOxNy), aluminum oxide (AlOx), and/or titanium oxide (TiOx).

The color conversion layer CCL may be located on the fourth insulating layer INS4 of the emission area EMA. The color conversion layer CCL may change and/or transmit a wavelength of light provided from the light-emitting element LD. In one or more embodiments, the light-emitting element LD may emit blue light.

For example, when the pixel PXL is a red pixel, the color conversion layer CCL may include a first color conversion particle QD1. The first color conversion particle QD1 may convert the blue light into red light. The first color conversion particle QD1 (e.g., a quantum dot) may absorb the blue light, and may shift a wavelength according to energy transition to emit the red light.

When the pixel PXL is a green pixel, the color conversion layer CCL may include a second color conversion particle QD2. The second color conversion particle QD2 may convert the blue light into green light. The second color conversion particle QD2 may absorb the blue light, and may shift a wavelength according to energy transition to emit the green light.

When the pixel PXL is blue, the color conversion layer CCL may include a light-scattering particle SCT, and may function as a light-scattering layer. In one or more other embodiments, when the pixel PXL is blue, a transparent polymer may be provided instead of the color conversion layer CCL.

In one or more embodiments, a dummy pattern DP may be located on the bank BNK of the non-emission area NEA. In one or more embodiments, the dummy pattern DP may be directly located on the fourth insulating layer INS4 on the bank BNK in the non-emission area NEA. However, this is an example, and in the non-emission area NEA from which the fourth insulating layer INS4 is removed, the dummy pattern DP may be directly located on the bank BNK.

In one or more embodiments, the dummy pattern DP may include an inorganic insulating material. For example, the dummy pattern DP may include one material among silicon oxide (SiOx), silicon nitride (SiNx), silicon oxynitride (SiOxNy), aluminum oxide (AlOx), and/or titanium oxide (TiOx).

In one or more embodiments, the dummy pattern DP may include a reflective material and/or a black material having a light-blocking property. The dummy pattern DP may reduce or prevent the likelihood of a light leakage defect in which light (e.g., light rays) leaks between the pixel PXL and the pixels PXL adjacent thereto. For example, the dummy pattern DP may be a black matrix. Alternatively, the dummy pattern DP may include carbon black, but is not limited thereto. Accordingly, light output efficiency of the light-emitting elements LD and the pixel PXL may be improved.

A capping layer CPL may be located on the color conversion layer CCL and the dummy pattern DP. In one or more embodiments, the capping layer CPL may be provided over (e.g., over an entirety of) the display area DA, and may be directly located on the dummy pattern DP and the color conversion layer CCL.

The capping layer CPL may be an inorganic layer (or an inorganic insulating layer) including an inorganic material. For example, the capping layer CPL may include at least one of a metal oxide such as silicon nitride ($SiN_x$), silicon oxide ($SiO_x$), silicon oxynitride ($SiO_xN_y$), and/or aluminum oxide ($AlO_x$). The capping layer CPL may protect the color conversion layer CCL by covering the color conversion layer CCL.

In one or more embodiments, a dummy bank D_BNK may be further located on the capping layer CPL of the non-emission area. For example, an upper surface of the dummy bank D_BNK may have a height similar to that of the capping layer CPL or the color conversion layer CCL.

The dummy bank D_BNK is configured to include at least one light-blocking material and/or reflective material so as to allow the light emitted from the light-emitting elements LD to further proceed in an image display direction (or the third direction DR3) of the display device DD, thereby improving light output efficiency of the light-emitting element LD.

According to one or more embodiments, the dummy bank D_BNK may be omitted, and a corresponding portion may be filled with an organic layer OL, which is a planarization layer.

The organic layer OL may be located on the capping layer CPL and the dummy bank D_BNK. The organic layer OL may alleviate a step difference generated by components located thereunder, and may provide a flat surface thereon. For example, the organic layer OL may function as a planarization layer. The organic layer OL may be a common layer commonly provided to the display area DA, but is not limited thereto.

The color filter layer CFL may be located on the organic layer OL. The color filter layer CFL may include color filters CF of a first color filter CF1, a second color filter CF2, and a third color filter CF3.

The color filters CF may selectively transmit light of a corresponding color. The color filters CF may include a color filter material that selectively transmits light of a corresponding color converted by the color conversion layer CCL. The first color filter CF1 may overlap the emission area EMA of the pixel emitting a first color. For example, a red color filter may be located to overlap the emission area EMA of a red pixel. As described above, the first color filter CF1, the second color filter CF2, and the third color filter CF3 may be a red color filter, a green color filter, and a blue color filter according to an emission color of the pixel, respectively.

In one or more embodiments, the first, second, and third color filters CF1, CF2, and CF3 may be stacked to overlap at least a portion of the non-emission area NEA. Therefore, a stack structure of the color filters CF in the non-emission area NEA may have a light-blocking function, and may serve to improve display quality.

Figure 8:
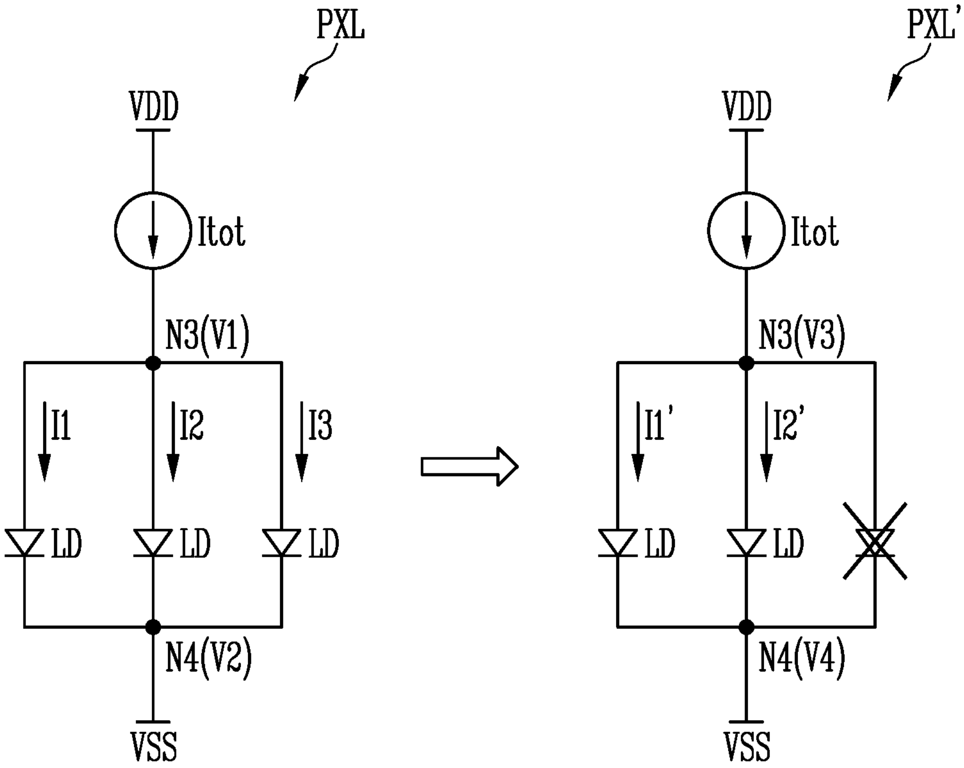
FIG. 8 is a schematic diagram illustrating a current provided to light-emitting elements of the pixel.

FIG. 8 is a schematic diagram illustrating a current provided to the light-emitting elements of the pixel.

Referring to FIGS. 4, 5, and 8, the pixel PXL may include a plurality of light-emitting elements LD connected in parallel between a third node N3 and a fourth node N4.

In FIG. 8, the pixel circuit PXC of the pixel PXL is omitted for convenience of description, and the current (e.g., the driving current) provided from the pixel circuit PXC to the light-emitting elements LD may be understood as a total current Itot provided by a current source (e.g., predetermined current source). For example, the total current Itot may be determined according to a magnitude of the data signal provided to the pixel PXL.

The driving current generated by the pixel circuit PXC may be automatically distributed and provided to the light-emitting elements LD effectively connected in parallel. For example, when three light-emitting elements LD operate effectively, a first current I1, a second current I2, and a third current I3 may be provided to the three light-emitting elements LD, respectively. A sum of the first current I1, the second current I2, and the third current I3 may be equal to a magnitude of the total current Itot.

A magnitude of the first current I1, the second current I2, and the third current I3 may be determined according to an element characteristic (e.g., an I-V characteristic of the light-emitting element LD having a diode characteristic). Therefore, magnitudes of at least two of the first current I1, the second current I2, and the third current I3 may be substantially the same, and all of the first current I1, the second current I2, and the third current I3 may be different.

In addition, a first voltage V1 and a second voltage V2 may be respectively detected at the third node N3 and the fourth node N4, which are both ends to which the light-emitting elements are connected, respectively, in correspondence with the total current Itot. The first current I1, the second current I2, and the third current I3 may be dependently determined by a deviation of the first voltage V1 and the second voltage V2.

Due to a light-emitting element imperfectly connected between pixel electrodes, a defect in the light-emitting element itself, or the like, some light-emitting elements may operate abnormally, and might not emit light while the display device is driven. For example, as shown in FIG. 8, one of the three light-emitting elements LD normally operating in a pixel PXL' is non-conductive, and only two light-emitting elements LD may operate.

Therefore, the total current Itot may be distributed to the two light-emitting elements LD. That is, a current otherwise supplied to the three light-emitting elements LD may be instead concentrated to the two light-emitting elements LD. A first current I1' of the pixel PXL' may be greater than the first current I1 of the pixel PXL, and a second current I2' of the pixel PXL' may be greater than the second current I2 of the pixel PXL. A current increase amount may depend on an I-V characteristic of an individual light-emitting element LD.

As described above, as the total current Itot may be concentrated to some normal light-emitting elements LD, a hot-spot in which only a local area is brightly shining in the pixel PXL' may appear, and there may be an acceleration of deterioration of the light-emitting element LD of which a current amount is excessively increased. Therefore, a display defect of the display device DD may occur, and a lifespan of the display device DD may be shortened.

Therefore, a configuration for reducing, preventing, or minimizing an amount of current increase of the individual light-emitting element LD due to a conduction defect of the light-emitting element LD occurring while the display device DD is used may be suitable.

When the first current I1' and the second current I2' are changed, a voltage of the third node N3 and a voltage of the fourth node N4 may change to a third voltage V3 and a fourth voltage V4 by the I-V characteristic of the light-emitting element LD. Therefore, a voltage difference (e.g., V3−V4) between the third node N3 and the fourth node N4 may vary. In other words, a voltage difference of the respective ends of the light-emitting elements LD may exceed a threshold range due to the current amount increase of the individual light-emitting element LD due to a conduction defect of some of the light-emitting elements LD connected in parallel.

The display device DD according to one or more embodiments of the disclosure may include a detector and a current compensator for detecting a voltage difference between the ends of the light-emitting elements LD due to a conduction defect of the light-emitting elements LD, and for compensating for a current flowing through the light-emitting elements LD.

Figure 9:
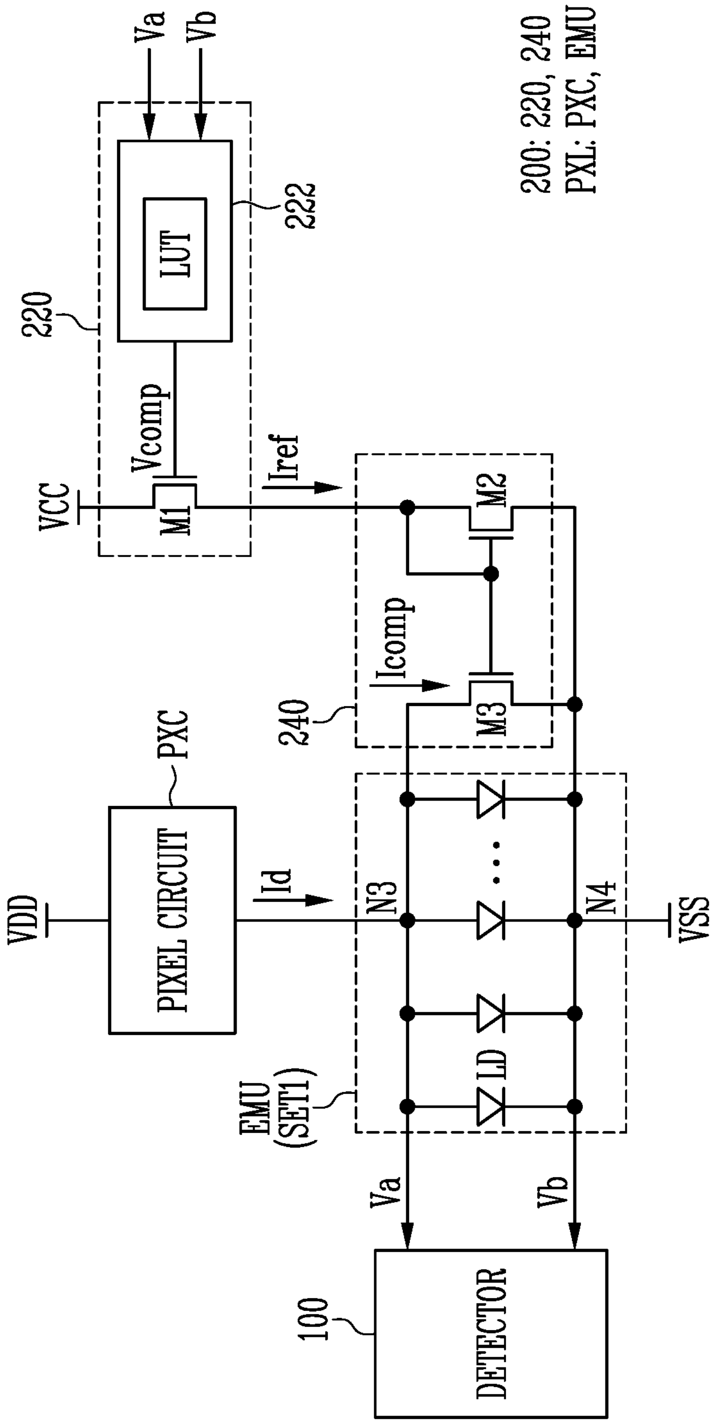
FIG. 9 is a schematic diagram illustrating an example of the display device of FIG. 3.

FIG. 9 is a schematic diagram illustrating an example of the display device of FIG. 3.

Referring to FIGS. 3, 4, and 9, the display device DD may include the pixel PXL, a detector 100, and a current compensator 200.

The pixel PXL may include the pixel circuit PXC and the light-emitting unit EMU. Because the pixel circuit PXC and the light-emitting unit EMU are described in detail with reference to FIG. 4, an overlapping description is omitted.

The pixel circuit PXC may generate a driving current Id based on the data signal. The driving current Id may be provided to the light-emitting unit EMU.

The light-emitting unit EMU may include a light-emitting stage SET1 (or first light-emitting stage). The light-emitting stage SET1 may include light-emitting elements LD connected in parallel between the third node N3 and the fourth node N4. When the current mirror unit 240 does not operate, the driving current Id may be distributed and may flow to the light-emitting elements LD of the light-emitting stage SET1.

The detector 100 may detect voltages of both ends of the light-emitting stage SET1. The respective ends of the light-emitting stage SET1 may be understood as corresponding to the third node N3 and the fourth node N4. A first detection voltage Va may be detected at the third node N3, and a second detection voltage Vb may be detected at the fourth node N4. For example, in FIG. 9, the second detection voltage Vb may be substantially equal to the voltage of the second power VSS.

The detector 100 may provide the first detection voltage Va and the second detection voltage Vb to the current compensator 200.

A configuration of the detector 100 is not limited to any circuit or configuration. For example, the detector 100 may be implemented with various types of voltage detection circuits that detect a voltage of corresponding nodes.

The current compensator 200 may compensate for the current flowing through the light-emitting stage SET1 based on a voltage difference between the detected voltages (e.g., a first voltage V1 and a second voltage V2). In one or more embodiments, the current compensator 200 may include a reference current generator 220 (or a first reference current generator) and the current mirror unit 240 (or a first current mirror unit).

The reference current generator 220 may receive the first detection voltage Va and the second detection voltage Vb. The reference current generator 220 may calculate a first voltage difference, which is a voltage difference between the first detection voltage Va and the second detection voltage Vb. For example, the reference current generator 220 may include a hardware circuit and/or software that calculates the first voltage difference.

The reference current generator 220 may determine a compensation voltage Vcomp based on the first voltage difference. In one or more embodiments, the compensation voltage Vcomp may be determined in consideration of magnitudes of the first voltage difference and the driving current Id. The driving current Id may vary according to a voltage value of the data signal. In addition, when the driving current Id changes, the first voltage difference may also change.

In one or more embodiments, the reference current generator 220 may include a lookup table LUT having corresponding voltage values according to the magnitudes of the driving current Id and the first voltage difference. The lookup table LUT may include a plurality of tables set according to a value or a range of the driving current Id.

In addition, the reference current generator 220 may further include a compensation voltage determiner 222 that selects the compensation voltage Vcomp using the lookup table LUT and the first voltage difference. The compensation voltage determiner 222 may include a hardware and/or software configuration that outputs a voltage (e.g., predetermined voltage) using the lookup table LUT.

According to one or more embodiments, the compensation voltage Vcomp may have a value that is different from the first voltage difference. As described above, the compensation voltage Vcomp may be quickly determined and output using the lookup table LUT.

However, this is only an example, and driving for determining the compensation voltage Vcomp is not limited thereto.

In one or more embodiments, the reference current generator 220 may further include a first transistor M1 that operates in response to the compensation voltage Vcomp. The first transistor M1 may be connected between DC power (e.g., predetermined DC power) and the current mirror unit 240. The compensation voltage Vcomp may be provided to a gate electrode of the first transistor M1.

A magnitude of a reference current Iref flowing through the first transistor M1 may be determined according to a magnitude of the compensation voltage Vcomp. When the first transistor M1 is turned off, the reference current Iref and a compensation current Icomp are not generated. In one or more embodiments, when the first voltage difference is lower than a threshold value (e.g., preset threshold value) corresponding to the corresponding driving current Id, the first transistor M1 may be turned off. For example, when the first voltage difference is lower than the threshold value, it may be determined that a light-emitting element of a contact defect or the like is generated at a standard (e.g., predetermined standard) or less in the light-emitting stage SET1, and the compensation current Icomp may not be generated.

The current mirror unit 240 may be connected to the light-emitting stage SET1. For example, the current mirror unit 240 may be connected to the third node N3 and the fourth node N4.

The current mirror unit 240 may provide the compensation current Icomp (or a first compensation current) to a path, which is connected with the light-emitting stage SET1 in parallel, based on the first voltage difference (or the compensation voltage Vcomp).

In one or more embodiments, the current mirror unit 240 may include a current mirror circuit including second and third transistors M2 and M3.

The second transistor M2 may be connected between the first transistor M1 and the fourth node N4. The second transistor M2 may receive the reference current Iref from the first transistor M1. The second transistor M2 may have a diode connection form. For example, a gate electrode and a source electrode of the second transistor M2 may be connected to each other.

The third transistor M3 may be connected between the third node N3 and the fourth node N4. For example, the third transistor M3 may be connected with the light-emitting stage SET1 in parallel.

The third transistor M3 may share a gate electrode with the second transistor M2, and a current mirror may be generated by the second transistor M2 and the third transistor M3.

The compensation current Icomp to which the reference current Iref is copied through the third transistor M3 may be generated. A portion of the driving current Id may be distributed as the compensation current Icomp. For example, a sum of a total current flowing to the light-emitting elements LD and the compensation current Icomp may be substantially equal to the driving current Id provided to the light-emitting stage SET1.

Therefore, even though conduction of some of the light-emitting elements LD may have failed, a phenomenon in which a current is concentrated to normal light-emitting elements LD may be minimized or alleviated.

As described above, the current compensator 200 may limit a maximum current flowing to each of the light-emitting elements LD using the compensation current Icomp.

As described above, the display device DD according to one or more embodiments of the disclosure may generate the compensation current Icomp flowing to a current path connected with the light-emitting elements LD in parallel based on the voltage difference of the respective ends of the light-emitting stage SET1. Therefore, the maximum current of each light-emitting element LD may be limited. In addition, a hot-spot and a deterioration deviation of the light-emitting elements LD caused by concentration of a current to the light-emitting element LD due to a contact defect, a conduction defect, or the like of some of the light-emitting elements LD occurring during an operation of the display device DD may be reduced, prevented, or minimized.

FIG. 9 shows one or more embodiments in which the detector 100 and the current compensator 200 are connected to one pixel PXL, but the disclosure is not limited thereto. For example, at least one of the detector 100 and/or the current compensator 200 may perform a function in a pixel block unit including a plurality of pixels.

Figure 10:
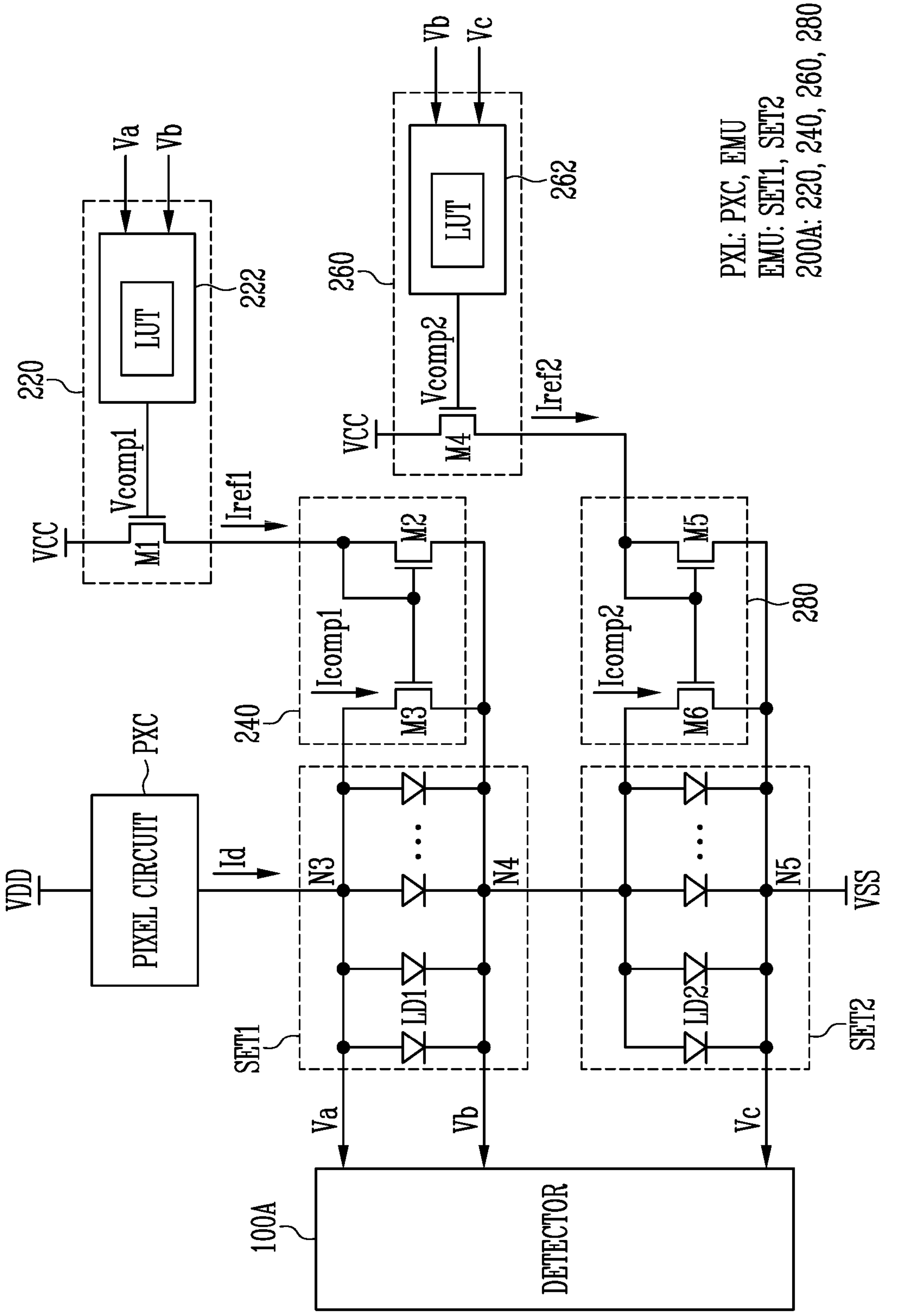
FIG. 10 is a schematic diagram illustrating an example of the display device of FIG. 3.

FIG. 10 is a schematic diagram illustrating an example of the display device of FIG. 3.

In FIG. 10, the same or similar components described with reference to FIG. 9 use the same reference numerals, and an overlapping description is omitted.

Referring to FIGS. 3, 4, 5, and 10, the display device DD may include the pixel PXL, a detector 100A, and the current compensator 200A.

The pixel PXL may include the pixel circuit PXC and the light-emitting unit EMU. The light-emitting unit EMU may include a first light-emitting stage SET1 and a second light-emitting stage SET2. The first light-emitting stage SET1 may include first light-emitting elements LD1 connected in parallel between the third node N3 and the fourth node N4. The second light-emitting stage SET2 may include second light-emitting elements LD2 connected in parallel between the fourth node N4 and a fifth node N5.

The detector 100A may detect voltages of respective ends of the first light-emitting stage SET1 and voltages of respective ends of the second light-emitting stage SET2. For example, the detector 100A may respectively detect voltages of each of the third node N3, the fourth node N4, and the fifth node N5 as a first detection voltage Va, a second detection voltage Vb, and a third detection voltage Vc.

The current compensator 200 may include a first reference current generator 220, a first current mirror unit 240, a second reference current generator 260, and a second current mirror unit 280.

The first reference current generator 220 may select a first compensation voltage Vcomp1 based on a first voltage difference, which is a voltage difference between the first detection voltage Va and the second detection voltage Vb, and may generate a first reference current Iref1 based on the first compensation voltage Vcomp1. In one or more embodiments, the first reference current generator 220 may include the lookup table LUT and the compensation voltage determiner 222 described above.

The first current mirror unit 240 may generate a first compensation current Icomp1 to which the first reference current Iref1 is copied. The first compensation current Icomp1 may be provided to a current path connected with the first light-emitting stage SET1 in parallel.

The second reference current generator 260 may select a second compensation voltage Vcomp2 based on a second voltage difference, which is a voltage difference between the second detection voltage Vb and the third detection voltage Vc, and may generate a second reference current Iref2 based on the second compensation voltage Vcomp2. In one or more embodiments, the second reference current generator 260 may include the lookup table LUT and a compensation voltage determiner 262. The compensation voltage determiner 262 may perform substantially the same function as the compensation voltage determiner 222 of the first reference current generator 220. In addition, the second reference current generator 260 may include a fourth transistor M4 corresponding to the first transistor M1.

The second current mirror unit 280 may generate a second compensation current Icomp2 to which the second reference current Iref2 is copied. The second compensation current Icomp2 may be provided to a current path connected with the second light-emitting stage SET2 in parallel. In one or more embodiments, the second current mirror unit 280 may include a fifth transistor M5 and a sixth transistor M6. A connection relationship between the fourth, fifth, and sixth transistors M4, M5, and M6 may be similar to that of the first, second, and third transistors M1, M2, and M3.

A configuration and an operation of the second reference current generator 260 and the second current mirror unit 280 are substantially identical to, or similar to, those of the reference current generator 220 and the current mirror unit 240 described with reference to FIG. 9, respectively, and thus an overlapping description is omitted.

Figure 11:
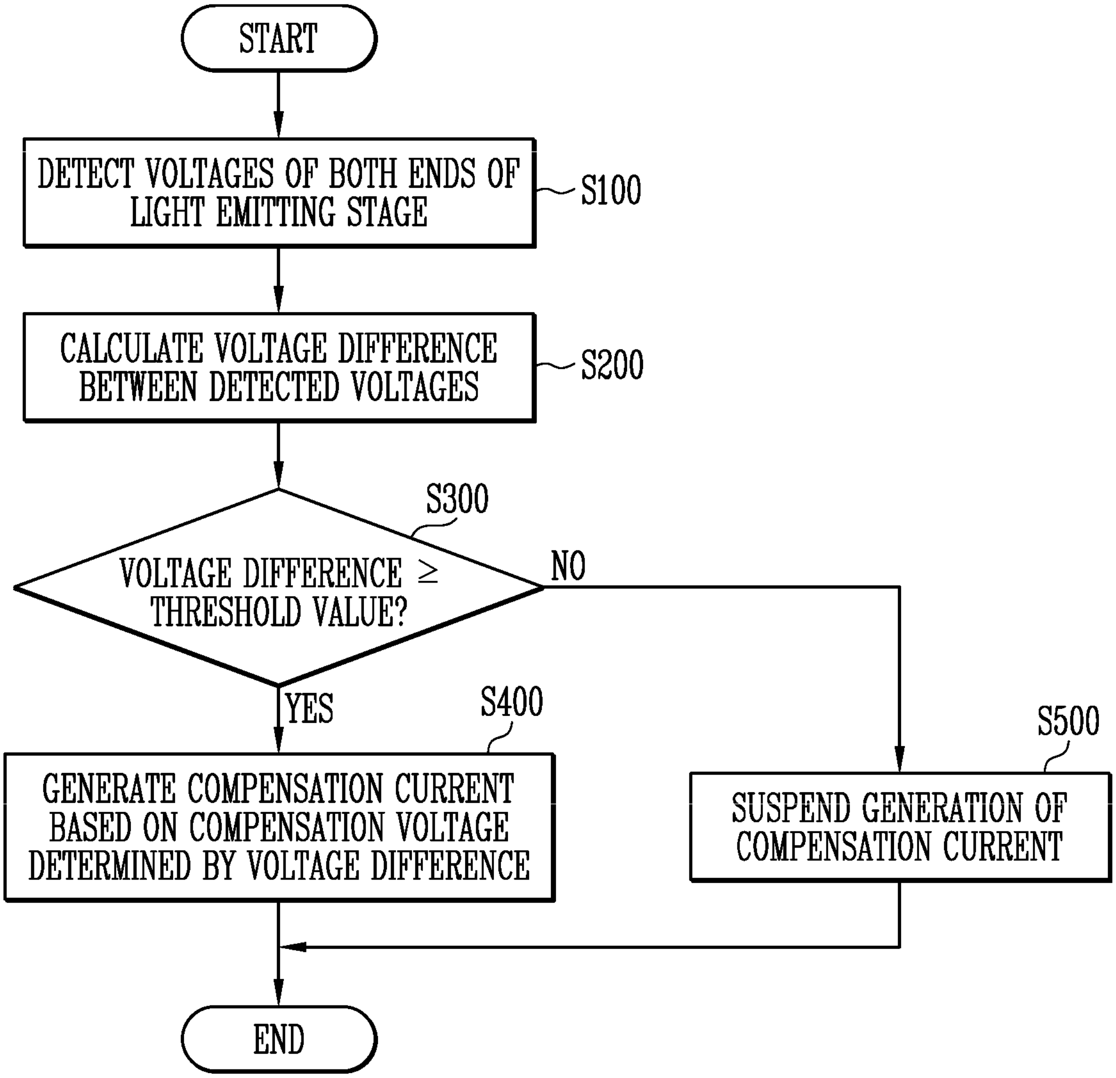
FIG. 11 is a flowchart illustrating a method of driving a display device according to one or more embodiments of the disclosure.

FIG. 11 is a flowchart illustrating a method of driving a display device according to one or more embodiments of the disclosure.

Referring to FIG. 11, the method of driving the display device may include detecting respective voltages of both ends of a light-emitting stage to which a driving current is applied (S100), calculating a voltage difference between the detected voltages (S200), and deciding to provide a compensation current to a current path connected to the light-emitting stage in parallel based on the voltage difference (S300, S400, and S500).

Deciding to provide the compensation current (S300, S400, and S500) may include comparing the calculated voltage difference with a threshold value (e.g., preset threshold value) (S300). When the voltage difference is equal to or greater than the threshold value, a compensation current may be generated based on a compensation voltage determined based on the voltage difference (S400). When the voltage difference is lower than the threshold value, generation of the compensation current may be suspended (S500).

In one or more embodiments, the compensation voltage may be selected from the lookup table having corresponding voltage values according to the magnitude of the voltage difference. Additionally, the compensation voltage may drive the current mirror circuit that generates the compensation current. The magnitude of the compensation current may be adjusted according to the compensation voltage.

In one or more embodiments, when the light-emitting stage emits light, the compensation current may limit the maximum current flowing to each of the light-emitting elements. In addition, the sum of the total current flowing through the light-emitting elements and the compensation current may be equal to the driving current provided to the light-emitting stage.

Because the method of driving the display device is described in detail with reference to FIGS. 8 to 10, an overlapping description is omitted.

As described above, the display device and the method of driving the same according to one or more embodiments of the disclosure may generate the compensation current flowing to the current path connected with the light-emitting elements in parallel based on the voltage difference of the both ends of the light-emitting stage. Therefore, the maximum current of each light-emitting element may be limited. In addition, a hot-spot and a deterioration deviation of the light-emitting elements LD caused by concentration of a current to the light-emitting element due to a contact defect, a conduction defect, or the like of some of the light-emitting elements occurring during an operation of the display device may be reduced, prevented, or minimized.

Although the disclosure has been described with reference to the embodiments thereof, those skilled in the art will understand that the disclosure may be variously modified and changed without departing from the spirit and scope of the disclosure disclosed in the following claims.

What is claimed is:

1. A display device comprising:

a pixel circuit configured to generate a driving current based on a data signal supplied to a data line;

a first light-emitting stage configured to emit light based on the driving current, and comprising first light-emitting elements connected in parallel;

a detector configured to detect voltages of respective ends of the first light-emitting stage; and a current compensator configured to compensate for a current flowing through the first light-emitting stage based on a first voltage difference between the voltages of the respective ends of the first light-emitting stage.

2. The display device according to claim 1, wherein the current compensator comprises a first current mirror unit connected to the first light-emitting stage, and configured to provide a first compensation current to a path, which is connected with the first light-emitting stage in parallel, based on the first voltage difference.

3. The display device according to claim 2, wherein the current compensator further comprises a reference current generator for determining a compensation voltage based on the first voltage difference, and for generating a reference current corresponding to the first compensation current in response to the compensation voltage.

4. The display device according to claim 3, wherein the reference current generator comprises a first transistor connected between DC power and the first current mirror unit, and comprising a gate electrode configured to receive the compensation voltage.

5. The display device according to claim 4, wherein the first current mirror unit comprises:

a second transistor that is diode-connected, and that is configured to receive the reference current from the first transistor; and a third transistor comprising a gate electrode connected to a gate electrode of the second transistor, and configured to generate the first compensation current to which the reference current is copied.

6. The display device according to claim 5, wherein the third transistor is connected in parallel with the first light-emitting stage.

7. The display device according to claim 4, wherein the reference current generator is configured to turn off the first transistor when the first voltage difference is lower than a threshold value.

8. The display device according to claim 7, wherein the reference current generator is configured to select the compensation voltage using a lookup table having voltage values respectively corresponding to magnitudes of the first voltage difference.

9. The display device according to claim 2, wherein the current compensator is configured to limit a maximum current flowing to each of the first light-emitting elements using the first compensation current.

10. The display device according to claim 2, wherein a sum of a total current of the first light-emitting elements and the first compensation current is equal to the driving current.

11. The display device according to claim 2, further comprising a second light-emitting stage configured to emit light based on the driving current, connected with the first light-emitting stage in series, and comprising second light-emitting elements connected in parallel, wherein the detector is further configured to detect respective voltages of ends of the second light-emitting stage.

12. The display device according to claim 11, wherein the current compensator further comprises a second current mirror unit connected to the second light-emitting stage, and configured to provide a second compensation current to a path connected with the second light-emitting stage in parallel based on a second voltage difference between the respective voltages of the ends of the second light-emitting stage.

13. The display device according to claim 12, wherein the current compensator further comprises a reference current generator configured to determine a compensation voltage based on the second voltage difference, and configured to generate a reference current corresponding to the second compensation current in response to the compensation voltage.

14. A method of driving a display device comprising a light-emitting stage of light-emitting elements connected in parallel, the method comprising:

detecting respective voltages of ends of the light-emitting stage to which a driving current is applied;

calculating a voltage difference between the voltages; and providing a compensation current to a current path connected to the light-emitting stage in parallel based on the voltage difference.

15. The method according to claim 14, wherein providing the compensation current comprises:

comparing the voltage difference with a threshold value;

generating the compensation current based on a compensation voltage determined based on the voltage difference being equal to or greater than the threshold value; and suspending generation of the compensation current based on the voltage difference being lower than the threshold value.

16. The method according to claim 15, wherein the compensation voltage drives a current mirror circuit for generating the compensation current, and wherein a magnitude of the compensation current is adjusted according to the compensation voltage.

17. The method according to claim 16, wherein the compensation voltage is selected from a lookup table having corresponding voltage values according to a magnitude of the voltage difference.

18. The method according to claim 16, wherein the compensation current limits a maximum current flowing to each of the light-emitting elements when emitting light.

19. The method according to claim 16, wherein a sum of a total current of the light-emitting elements and the compensation current is equal to the driving current.

* * * * *